(12) United States Patent
Nakamura et al.

(10) Patent No.: US 8,258,763 B2
(45) Date of Patent: Sep. 4, 2012

(54) SWITCHING POWER SUPPLY UNIT AND CONTROL CIRCUIT FOR SAME

(75) Inventors: Masaru Nakamura, Niiza (JP); Chiharu Matsumoto, Niiza (JP)

(73) Assignee: Sanken Electric Co., Ltd., Saitama (JP)

( * ) Notice: Subject to any disclaimer, the term of this patent is extended or adjusted under 35 U.S.C. 154(b) by 313 days.

(21) Appl. No.: 12/723,385

(22) Filed: Mar. 12, 2010

(65) Prior Publication Data

US 2010/0244800 A1    Sep. 30, 2010

(30) Foreign Application Priority Data

Mar. 25, 2009   (JP) ................................. 2009-073687

(51) Int. Cl.
*G05F 1/567* (2006.01)
*G05F 1/569* (2006.01)
*G05F 1/575* (2006.01)
(52) U.S. Cl. .................. 323/271; 323/285; 323/299
(58) Field of Classification Search .......... 323/241–246, 323/266, 271, 274–285, 312–314, 326, 351, 323/907, 909, 299; 363/31, 49, 52, 53, 56.03–56.05, 363/73, 77–79, 89, 123, 125, 127, 147, 56.07, 363/56.1
See application file for complete search history.

(56) References Cited

U.S. PATENT DOCUMENTS

| | | | | |
|---|---|---|---|---|
| 4,887,181 A * | 12/1989 | Lenz | ............................. | 361/103 |
| 5,119,265 A * | 6/1992 | Qualich et al. | ................ | 361/103 |
| 5,414,341 A | 5/1995 | Brown | | |
| 6,101,106 A * | 8/2000 | Shi | .................................. | 363/41 |
| 6,127,814 A * | 10/2000 | Goder | ............................ | 323/282 |
| 6,479,975 B1 * | 11/2002 | Plankensteiner et al. | ...... | 323/316 |
| 6,781,441 B2 * | 8/2004 | Mori | ............................... | 327/538 |
| 7,019,507 B1 * | 3/2006 | Dittmer et al. | ................. | 323/284 |
| 7,221,129 B2 | 5/2007 | Matsuo et al. | | |
| 7,598,715 B1 * | 10/2009 | Hariman et al. | ............... | 323/271 |
| 7,714,560 B2 * | 5/2010 | Fukumori | ...................... | 323/284 |
| 7,782,036 B1 * | 8/2010 | Wong et al. | .................... | 323/282 |
| 8,093,876 B2 * | 1/2012 | Araki et al. | ..................... | 323/284 |
| 2006/0022658 A1 * | 2/2006 | Harriman et al. | .............. | 323/284 |
| 2008/0111531 A1 * | 5/2008 | Hasegawa et al. | ............. | 323/284 |
| 2008/0211313 A1 * | 9/2008 | Nakamura | ....................... | 307/75 |

(Continued)

FOREIGN PATENT DOCUMENTS

| | | |
|---|---|---|
| JP | 2000-350440 A | 12/2000 |
| JP | 2002-84742 A | 3/2002 |
| JP | 2003-189598 A | 7/2003 |

(Continued)

*Primary Examiner* — Jeffrey Sterrett
*Assistant Examiner* — Nusrat Quddus
(74) *Attorney, Agent, or Firm* — Birch, Stewart, Kolasch & Birch, LLP

(57) ABSTRACT

There is provided a switching power supply unit having an overcurrent detection circuit capable of automatically selecting either a current detection method using an resistor or a current detection method using an external current detection resistor and of performing optimized overcurrent protection depending on applications. In the control circuit of the switching power supply unit for detecting a current flowing through a high-side switch as a current detection signal and comparing it with an overcurrent detection threshold value to detect an overcurrent and turning off the high-side switch to protect the switching power supply unit, a first current detection terminal connected to a power supply side terminal of the high-side switch or to a load side terminal of the high-side switch and a temperature compensating means to switch for temperature compensation on an overcurrent detection threshold value or on a current detection signal are provided.

11 Claims, 10 Drawing Sheets

U.S. PATENT DOCUMENTS

| | | | |
|---|---|---|---|
| 2009/0103335 A1* | 4/2009 | Nakamura | 363/21.17 |
| 2009/0103338 A1* | 4/2009 | Nakamura | 363/89 |
| 2009/0174378 A1* | 7/2009 | Xu et al. | 323/273 |
| 2009/0322302 A1* | 12/2009 | Fukushi | 323/284 |
| 2011/0254527 A1* | 10/2011 | Saito et al. | 323/284 |

FOREIGN PATENT DOCUMENTS

| | | |
|---|---|---|
| JP | 2005-176587 A | 6/2005 |
| JP | 2005-253219 A | 9/2005 |
| JP | 2005-318737 A | 11/2005 |
| JP | 2008-187847 A | 8/2008 |

\* cited by examiner

US 8,258,763 B2

SWITCHING POWER SUPPLY UNIT AND CONTROL CIRCUIT FOR SAME

BACKGROUND OF THE INVENTION

1. Field of the Invention

The present invention relates to a switching power supply unit and more particularly to the switching power supply unit and its control circuit which has an overcurrent detection circuit by using an ON resistor of a MOSFET (Metal Oxide Semiconductor Field Effect Transistor) and an overcurrent detection circuit by using an external current detection resistor.

2. Description of the Related Art

In an overcurrent detection circuit employed in the conventional switching power supply unit, it is known that the overcurrent detection circuit configured to detect an overcurrent by an external current detection resistor and the overcurrent detection circuit configured to detect an overcurrent by an ON resistor of the MOSFET are used separately in their proper way depending on their applications. The external current detection resistor is externally mounted in series on the MOSFET. In the case where an overcurrent is detected by using the external current detection resistor, since temperature dependence of a resistance value of the external current detection resistor is small, a special contrivance against temperature changes is not required as the overcurrent detection circuit, however, in the case where an overcurrent is detected by using the ON resistor of the MOSFET, since the ON resistor of the MOSFET exhibits very large temperature dependence, a temperature-compensated overcurrent detection circuit is necessary.

A conventional overcurrent detection method is described by referring to drawings.

FIG. 9 shows a conventional switching power supply unit (hereinafter called a "first DC/DC converter circuit") in which an overcurrent detection circuit for detecting an overcurrent by using an external current detection resistor is employed.

The first DC/DC converter circuit includes an input voltage source $V_{IN}$, a control circuit 14, an n-channel high-side MOSFET 2, an external current detection resistor Rs, an n-channel low-side MOSFET 3, an inductor 8, a smoothing capacitor 9, load 10, and the like. The control circuit 14 is further made up of a current detection circuit 4, an overcurrent detection comparator 5, a gate driving circuit 6, a reference voltage source for an overcurrent detection threshold $V_{TH2}$, and the like.

A negative terminal of the input voltage source $V_{IN}$ is connected to GND (Ground terminal); a positive terminal of the input voltage source $V_{IN}$ is connected to a drain terminal of the high-side MOSFET 2; a source terminal of the high-side MOSFET 2 is connected to one terminal of the external current resistor Rs; the other terminal of the external current resistor Rs is connected to a drain terminal of the low-side MOSFET 3; and a source terminal of the low-side MOSFET 3 is connected to GND. A connection point between the other terminal of the external current resistor Rs and the drain terminal of the low-side MOSFET 3 is connected to one terminal of an inductor 8; the other terminal of the inductor 8 is connected to one terminal of a load 10; and the other terminal of the load 10 is connected to GND. One terminal of the load 10 is connected to one terminal of the smoothing capacitor 9, and the other terminal of the smoothing capacitor 9 is connected to GND. Moreover, $R_{ON}$ shows an ON resistor of the high-side MOSFET 2.

The control circuit 14 has an HD terminal, an SW terminal, an LD terminal, and a CS terminal, in which the HD terminal is connected to a gate terminal of the high-side MOSFET 2, the LD terminal is connected to a gate terminal of the low-side MOSFET 3, the SW terminal is connected to a connection point between another terminal of the external current detection resistor Rs and the drain terminal of the low-side MOSFET 3, and the CS terminal is connected to a connection point between the source terminal of the high-side MOSFET 2 and one terminal of the external current detection resistor Rs.

In the current detection circuit 4, to a non-reversal input terminal of an operational amplifier mounted therein is connected to the CS terminal and to its reversal input terminal is connected to the SW terminal and its output terminal is connected to an non-reversal input terminal of the overcurrent detection comparator 5. Further, to a reversal input terminal of the overcurrent detection comparator 5 is connected the reference voltage source for the overcurrent detection threshold value $V_{TH}$, and an output terminal of the overcurrent detection comparator is connected to an input terminal of the gate driving circuit 6. One output terminal of the gate driving circuit 6 is connected through the HD terminal to the gate terminal of the high-side MOSFET 2, and the other output terminal of the gate driving circuit 6 is connected through the LD terminal to the gate terminal of the low-side MOSFET 3. The external current detection resistor Rs, current detection circuit 4, overcurrent detection comparator 5, and reference voltage source for the overcurrent detection threshold $V_{TH2}$ make up the overcurrent detection circuit.

The first DC/DC converter circuit, by alternately performing switching between the high-side MOSFET 2 and low-side MOSFET 3, both connected between a positive terminal of the input voltage source $V_{IN}$ and GND, supplies power through the inductor 8 to the load 10.

The external current resistor Rs converts a current $I_{DH}$ flowing through the high-side MOSFET 2 into a voltage $\Delta V_{CS}$, and the current detection circuit 4 made up of the operational amplifier and the like produces and outputs a current detection signal $V_{SNS}$ based on the voltage $\Delta V_{CS}$.

The overcurrent detection comparator 5 compares the current detection signal $V_{SNS}$ with an overcurrent detection threshold value $V_{TH2}$, and, when the current detection signal $V_{SNS}$ becomes higher than the overcurrent detection threshold value $V_{TH2}$, outputs an OFF trigger signal to the gate driving circuit 6.

The gate driving circuit 6, by receiving the OFF trigger signal and outputting a low-level gate signal $H_{DRV}$ to the high-side MOSFET 2, turns off the high-side MOSFET 2.

On the other hand, FIG. 10 shows another conventional switching power supply unit (hereinafter, called a "second DC/DC converter circuit") in which an overcurrent detection circuit for detecting an overcurrent by using an ON resistor $R_{ON}$ of the high-side MOSFET 2 is employed. In the second DC/DC converter circuit, instead of the external current detection resistor Rs for detecting the current $I_{DH}$ flowing through the high-side MOSFET 2, the ON resistor $R_{ON}$ of the high-side MOSFET 2 is used, and, further, as the overcurrent detection threshold value to be used in the control circuit 15, a threshold value $V_{TH1}$ corresponding to the ON resistor $R_{ON}$ is used instead of the above-mentioned overcurrent detection threshold value $V_{TH2}$. The ON resistor $R_{ON}$ of the high-side MOSFET 2, overcurrent detection circuit 4, overcurrent detection comparator 5, and reference voltage source for the overcurrent detection threshold value $V_{TH1}$ make up the overcurrent detection circuit. In this case, the CS terminal is connected to a connection point between the positive terminal of the input voltage source $V_{IN}$ and the drain terminal of the high-side MOSFET 2. Here, there is a problem that, the ON resistor $R_{ON}$ exhibits positive temperature dependence of about +3000 ppm/□ to +6000 ppm/□, and, therefore, the overcurrent detection level depends on temperatures. To solve the problem of the temperature dependence of a resistance value of the ON resistor $R_{ON}$, a technology is disclosed in, for example, Japanese Patent Application Laid-open No. 2008-187847 (Patent Reference 1) in which changes in resistance value of the ON resistor $R_{ON}$ of the high-side MOSFET 2 caused by changes of ambient temperatures are cancelled by letting the overcurrent detection threshold value $V_{TH1}$ used in the control circuit 15 exhibit positive temperature dependence being equivalent to that of the ON resistor $R_{ON}$, and, as a result, the temperature dependence of the resistance value of the ON resistor $R_{ON}$ is offset.

Patent Document 1 refers to Japanese Patent Application No. JP-A-2008-187847

SUMMARY OF THE INVENTION

In the above-described conventional first DC/DC converter circuit by using the overcurrent detection circuit to detect an overcurrent by the external current detection resistor Rs, since the external current resistor Rs for detecting a current $I_{DH}$ flowing the high-side MOSFET2 is employed, the external current detection resistor Rs exhibits small temperature dependence and performs overcurrent detection with high accuracy, comparatively; however, a loss occurs due to the current $I_{DH}$ flowing through the high-side MOSFET 2 and to the use of the overcurrent detection resistor Rs; and, therefore, it is not suitably applicable to a small-sized power supply such as a module requiring high efficiency.

Moreover, in the above-described conventional second DC/DC converter circuit employing the overcurrent detection circuit for detecting an overcurrent by using the ON resistor $R_{ON}$ of the high-side MOSFET 2, as detecting current by employing the ON resistor $R_{ON}$ there is the merit of reducing the loss of currents and reducing counts of external components, however, a problem arises in that, unless large temperature dependence of a resistance of the ON resistor $R_{ON}$ is cancelled, it is impossible to realize high accurate current detection.

Therefore, the control circuit having the same configurations cannot be used for these two current detection methods, requiring the use of the control circuits having different configurations each corresponding to these two methods. As a result, a problem arises that kinds of the control circuit to be used are increased which lowers the volume productivity and raises costs, and, further, it is necessary to combine the switching power supply unit with control circuits so as to be suited to each of current detection methods, which also presents a problem that the management of kinds of the detection circuits is not easy.

In view of the above, it is an object of the present invention to provide a switching power supply unit and its control circuit capable of achieving optimized protection from an overcurrent depending on applications despite having the control circuit with the same configurations by automatically recognizing types of two current detection methods without addition of exclusive terminals, by selecting a temperature-compensated current detection threshold value in the case where an overcurrent is detected by an ON resistor of a MOSFET, and by selecting a non temperature-compensated current detection threshold value in the case where an overcurrent is detected by an external current detection resistor Rs.

The switching power supply unit stated in a first aspect of the present invention is characterized by having a first switch and second switch both connected in series to an input voltage source to supply power to a load from between said first switch and said second switch including a current detection device to detect a current flowing through the first switch and to output as a current detection signal, a first current detection terminal to be connected to either one terminal or another terminal of the first switch, an overcurrent detection circuit to detect an overcurrent flowing through the first switch by comparing the current detection signal with an overcurrent detection threshold value, and an overcurrent detection threshold value selecting device to change the overcurrent detection threshold value of the overcurrent detection circuit depending on whether the first current detection terminal is connected to the one terminal of the first switch or the first current detection terminal is connected to the another terminal of the first switch.

Also, the switching power supply unit stated in a second aspect is characterized in that the overcurrent detection threshold value selecting device, when the first current detection terminal is connected to the one terminal of the first switch, uses a temperature-compensated first overcurrent detection threshold value as the overcurrent detection threshold value for the overcurrent detection circuit and, when the first current detection terminal is connected to the another terminal of the first switch, uses a non temperature-compensated second overcurrent detection threshold value as the overcurrent detection threshold value of the overcurrent detection circuit.

Also, the switching power supply unit stated in a third aspect is characterized in that the first switch is a high-side switch and the second switch is a low-side switch.

Also, the switching power supply unit stated in a fourth aspect is characterized in that the overcurrent detection threshold value selecting device, when a voltage of the first current detection terminal is higher than a predetermined threshold voltage during a period while the high-side switch is off, uses the first overcurrent detection threshold value as the overcurrent detection threshold value of the overcurrent detection circuit.

Also, the switching power supply unit stated in a fifth aspect is characterized in that the overcurrent detection threshold value selecting device, when a voltage of the first current detection terminal is lower than the predetermined threshold voltage during a period while the high-side switch is off and the low-side switch is ON, uses the second overcurrent detection threshold value as the overcurrent detection threshold value.

Also, the switching power supply unit stated in a sixth aspect is characterized by having a first switch and second switch both connected in series to an input voltage source to supply power to a load from between the first switch and the second switch, including a current detection device to detect a current flowing through the first switch and to output as a current detection signal, a first current detection terminal to be connected to either one terminal or another terminal of the first switch, an offset voltage selecting device to select a different offset voltage depending on whether the first current detection terminal is connected to the one terminal of the first switch or the first current detection terminal is connected to the another terminal of the first switch, an overcurrent detection circuit to detect an overcurrent flowing through the first switch by comparing a value obtained by adding the offset voltage to the current detection signal with an overcurrent detection threshold value.

Also, the switching power supply unit stated in a seventh aspect in that the offset voltage selecting device, when the first current detection terminal is connected to one terminal of the first switch, uses a temperature-compensated first offset voltage as the offset voltage and, when the first current detection terminal is connected to the another terminal of the first switch, uses a non temperature-compensated second offset voltage as the offset voltage.

Also, the switching power supply unit stated in an eighth aspect is characterized in that the first switch is a high-side switch and the second switch is a low-side switch.

Also, the switching power supply unit stated in a ninth aspect is characterized in that the offset voltage, when a voltage of the first current detection terminal is higher than a predetermined threshold voltage during a period while the high-side switch is off, is generated by adding the first offset voltage to the current detection signal.

Also, the switching power supply unit stated in a tenth aspect is that the offset voltage, when a voltage of the first current detection terminal is lower than the predetermined threshold voltage during a period while the high-side switch is OFF and the low-side switch is ON, is generated by adding the second offset voltage to the current detection signal.

Furthermore, the control circuit for the switching power supply unit for detecting a current flowing through a first switch as a current detection signal and for detecting an overcurrent stated in an eleventh aspect of the present invention is characterized by comparing the current detection signal with an overcurrent detection threshold value and for protecting the switching power supply unit by turning off the first switch, and by including a first current detection terminal to be connected to either one terminal or another terminal of the first switch, a temperature compensation device to perform switching to provide temperature compensation to either the overcurrent detection threshold value or the current detection signal depending on an voltage inputted to the first current detection terminal.

With the above configuration, the switching power supply unit and its control circuit are provided which are capable of achieving optimized protection from an overcurrent depending on applications despite having the control circuit with the same configurations by automatically recognize types of two current detection methods without addition of exclusive terminals, by selecting a temperature-compensated current detection threshold value in the case where an overcurrent is detected by an ON resistor of a MOSFET, and by selecting a non temperature-compensated current detection threshold value in the case where an overcurrent is detected by an external current detection resistor.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1:
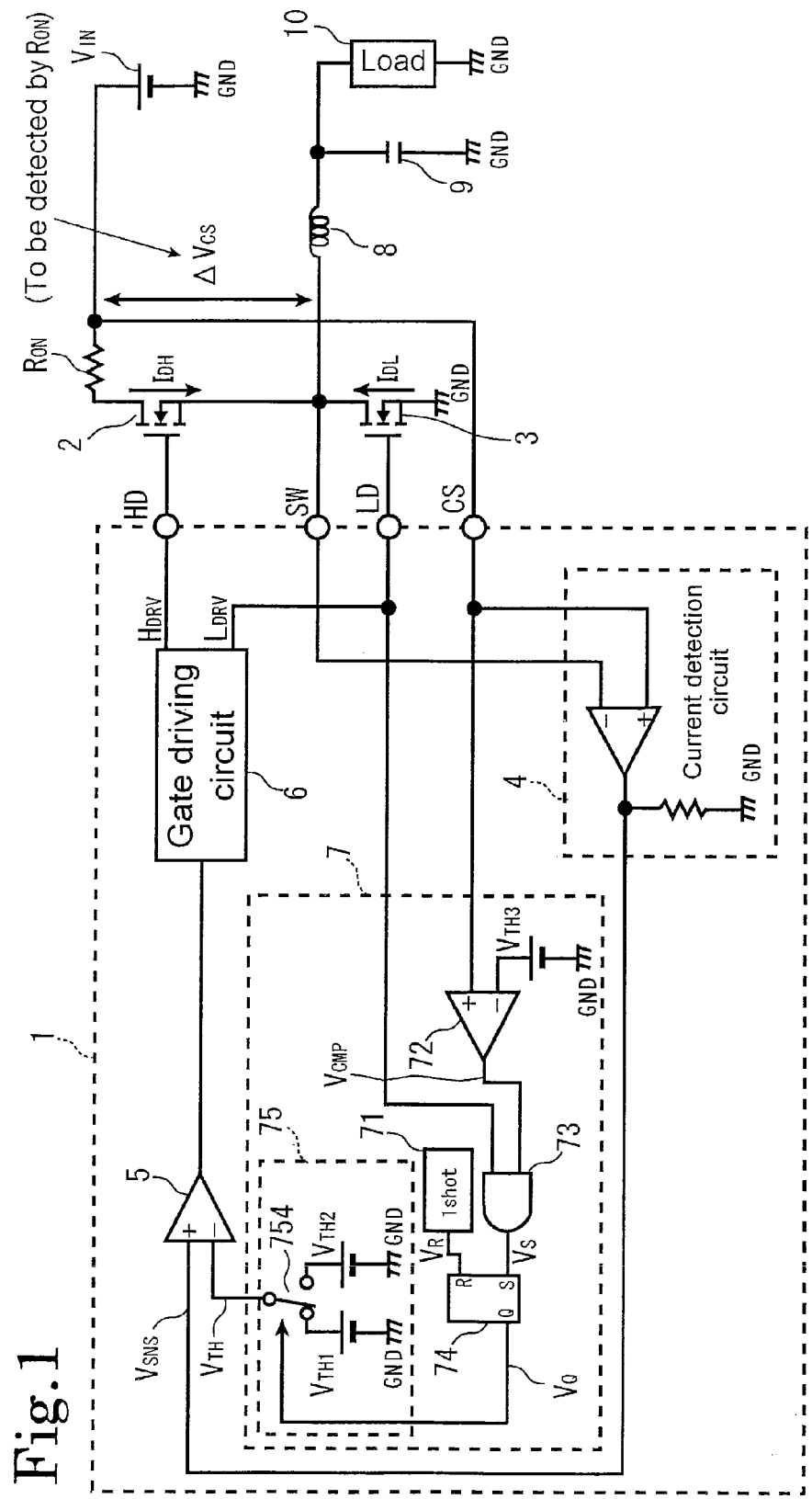
FIG. 1 is a diagram showing a concrete example of configurations of a switching power supply unit by using a control circuit of a first embodiment of the present invention for detecting an overcurrent by using an ON resistor of a MOSFET.
Figure 3:
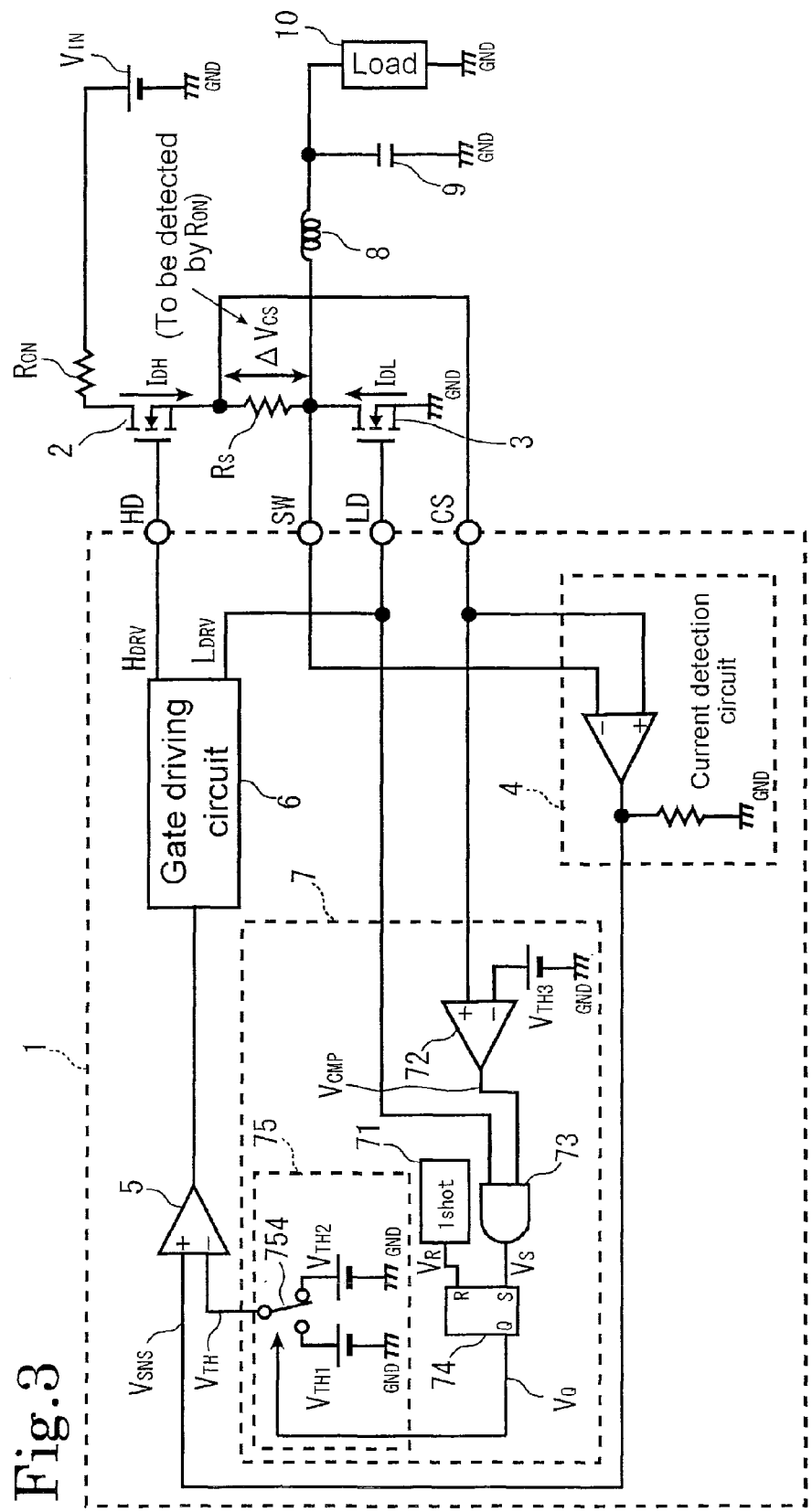
FIG. 3 is a diagram showing a concrete example of configurations of the switching power supply unit employing the control circuit for detecting an overcurrent by using an external current detection resistor according to the first embodiment of the present invention.
Figure 9:
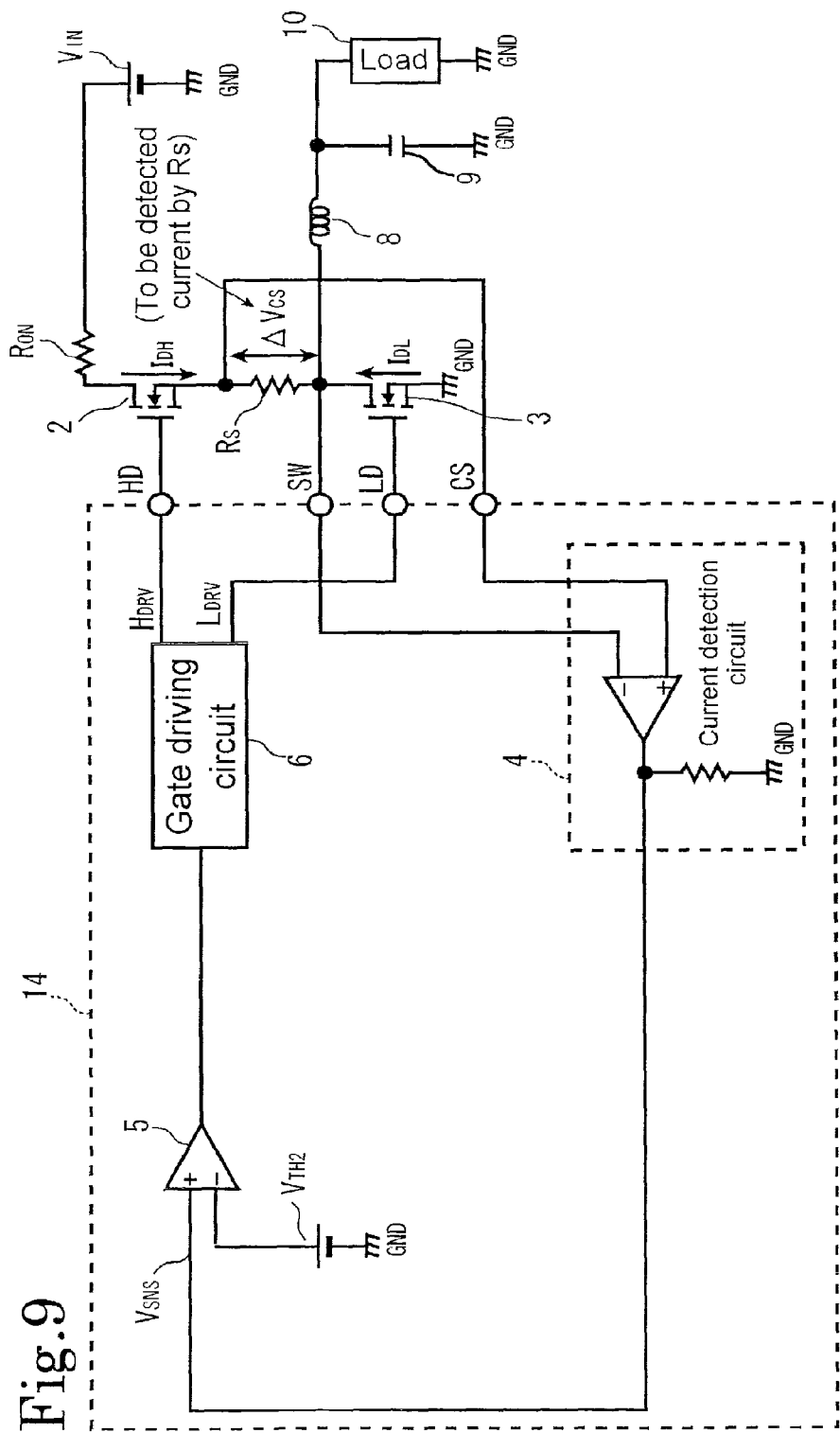
FIG. 9 is a diagram showing a concrete example of configurations of a conventional switching power supply unit in which an overcurrent is detected by an external current detection resistor.
Figure 10:
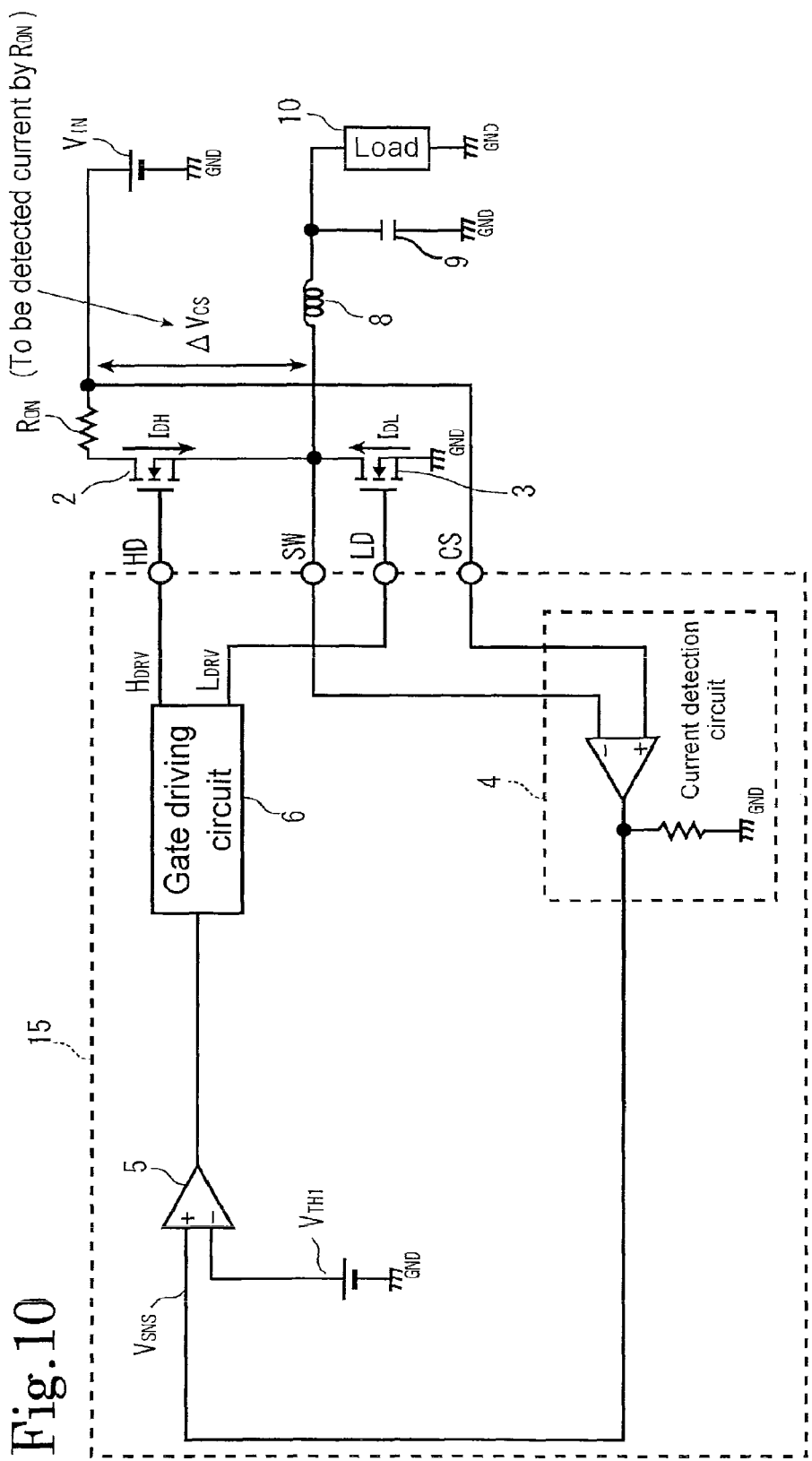
FIG. 10 is a diagram showing a concrete example of configurations of another conventional switching power supply unit in which an overcurrent is detected by an ON resistor of a MOSFET.

FIGS. 1 and 3 show a switching power supply unit by using a control circuit 1 of a first embodiment of the present invention. FIG. 1 shows a current detection method to detect an overcurrent by using an ON resistor of a MOSFET, and FIG. 3 shows a current detection method to detect an overcurrent by using an external current detection resistor. The switching power supply units of the first embodiment have configurations being the similar to those of the conventional first DC/DC converter circuit (FIG. 9) and of the conventional second DC/DC converter circuit (FIG. 10); however, the control circuit 1 of the first embodiment is provided with an overcurrent detection threshold value selecting circuit 7 unlike in the conventional control circuits 14 and 15. Hereinafter, the switching power supply unit by using an overcurrent detection circuit to detect an overcurrent by using the ON resistor of the MOSFET shown in FIG. 1 is referred to as a third DC/DC converter circuit, and the switching power supply unit using an overcurrent detection circuit to detect an overcurrent using an external current detection resistor shown in FIG. 3 is referred to as a fourth DC/DC converter circuit.

Firstly, circuit operations of the third DC/DC converter circuit are described by referring to FIGS. 1, 2, 5, and 6.

As shown in FIG. 1, the third DC/DC converter circuit includes an input voltage source $V_{IN}$, a control circuit 1, a high-side MOSFET (high-side switch) 2, a low-side MOSFET (low-side switch) 3, an inductor 8, a smoothing capacitor 9, a load 10, and the like. The $R_{ON}$ shows an ON resistor of the high-side MOSFET 2 (a current detection resistor to detect a current flowing through the high-side MOSFET 2).

Then, the control circuit 1 comprises a current detection circuit 4, an overcurrent detection comparator 5, a gate driving circuit 6, an overcurrent detection threshold value selecting circuit 7, and the like. The ON resistor $R_{ON}$ of the high-side MOSFET 2, current detection circuit 4, overcurrent detection comparator 5, and overcurrent detection threshold value selecting circuit 7 make up an overcurrent detection circuit.

In the input voltage source $V_{IN}$, a rectifier bridge and a DC smoothing circuit are mounted on its output side and uses AC/DC converter, which receives an AC voltage from a commercial power source with converting into a DC voltage.

A negative terminal of the input voltage source $V_{IN}$ is connected to GND; a positive terminal of the input voltage source $V_{IN}$, is connected to a drain terminal (a terminal on the power source side of the high-side switch) of the high-side MOSFET 2; a source terminal of high-side MOSFET 2 (a terminal on the load side of the high-side switch) is connected to a drain terminal (a terminal on the load side of the low-side switch) of the low-side MOSFET 3; and a source terminal (a terminal on the GND side of the low-side switch) of the low-side MOSFET 3 is connected to GND. Also, a connection point between a source terminal of the high-side MOSFET 2 and a drain terminal of the low-side MOSFET 3 is connected to one terminal of the inductor 8; the other terminal of the inductor 8 is connected to the other terminal of the load 10; and the other terminal of the load 10 is connected to GND. Also, the other terminal of the load 10 is connected to one terminal of the smoothing capacitor 9, and the other terminal of the smoothing capacitor 9 is connected to GND.

The control circuit 1 has an HD terminal, an SW terminal, an LD terminal, and a CS terminal. In the third DC/DC converter circuit shown in FIG. 1, the HD terminal is connected to a gate terminal (a terminal on the ON/OFF control side of the high-side switch) of the high-side MOSFET 2 and the LD terminal is connected to a gate terminal (a terminal on the ON/OFF control side of the low-side switch) of the low-side MOSFET 3; the SW terminal is connected to a connection point between the source terminal of the high-side MOSFET 2; the drain terminal of the low-side MOSFET 3; and the CS terminal is connected to a connection point between the positive terminal of the input voltage source $V_{IN}$ and the drain terminal of the high-side MOSFET 2.

In the current detection circuit 4, a non-reversal input terminal of an operational amplifier mounted internally is connected the CS terminal, its reversal input terminal is connected the SW terminal, and its input terminal is connected to the non-reversal input terminal of the overcurrent detection comparator 5. Thus, in order to use the ON resistor $R_{ON}$ of the high-side MODFET 2 for current detection, the reversal input terminal of the operational amplifier internally mounted in the current detection circuit 4 is connected through the SW terminal to the source terminal of the high-side MOSFET 2, and its non-reversal input terminal is connected through the CS terminal to the drain terminal of the high-side MOSFET 2.

Figure 5:
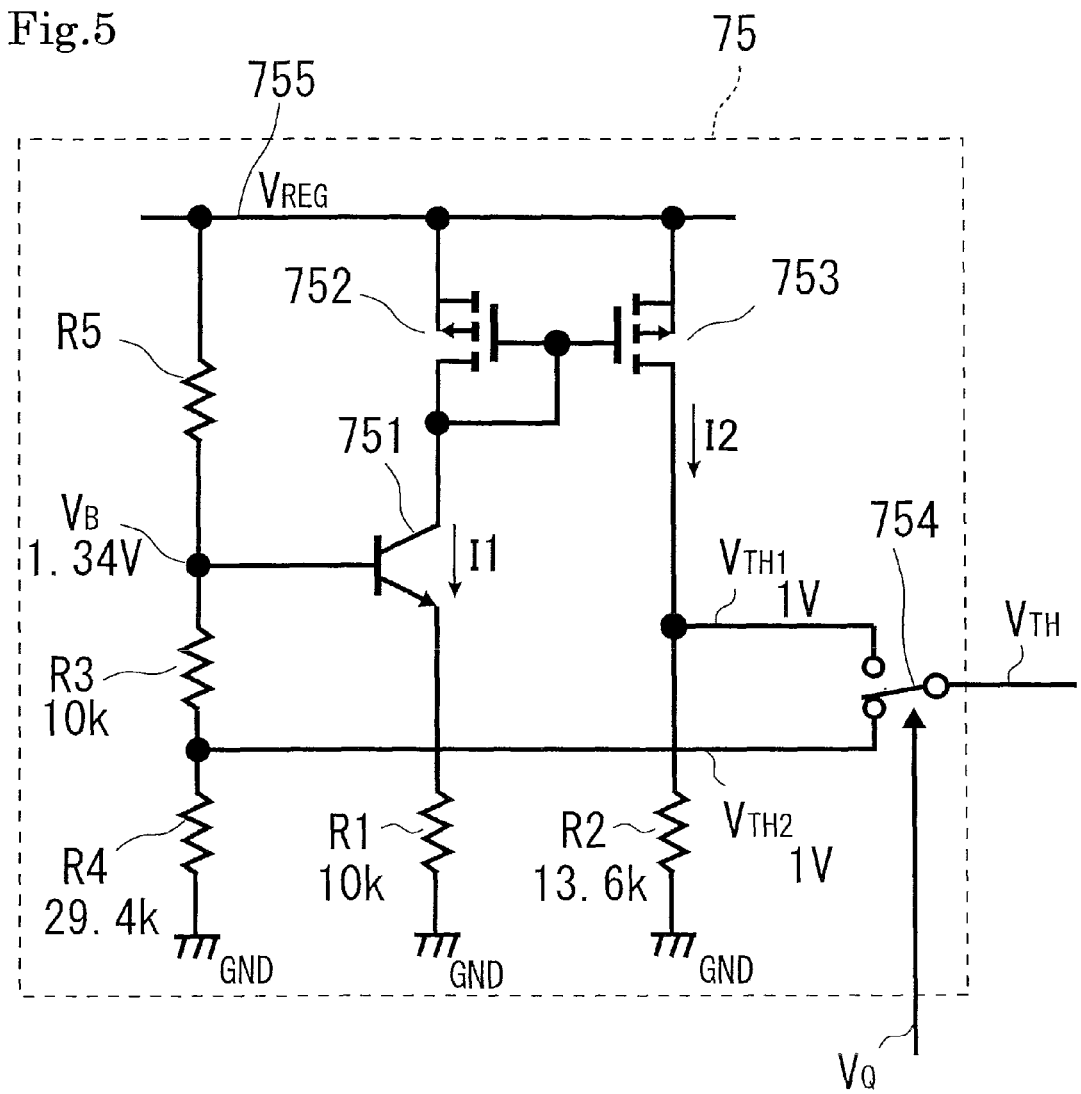
FIG. 5 is a diagram showing a concrete example of configurations of an overcurrent detection threshold value producing circuit of the first embodiment of the present invention.

The overcurrent detection threshold value selecting circuit 7 mounted in the control circuit 1 comprises a one-shot circuit 71, an overcurrent detection threshold value selecting comparator 72, a reference voltage source for a threshold voltage $V_{TH3}$, an AND circuit 73, an SR flip-flop 74, and an overcurrent detection threshold value producing circuit 75. Also, the overcurrent detection threshold value producing circuit 75 mounted in the overcurrent detection threshold value selecting circuit 7, though described later in detail by referring to FIG. 5, is made up of a reference voltage source for a temperature-compensated overcurrent detection threshold value $V_{TH1}$, of a reference voltage source for a non temperature-compensated overcurrent detection threshold value $V_{TH2}$, and of a switch 754 for selecting these overcurrent detection threshold values (the circuit shown in FIG. 1 is obtained by equivalently showing circuits in FIG. 5).

Then, in the overcurrent detection threshold comparator 72, its non-reversal input terminal is connected to the CS terminal; its reversal input terminal is connected to the reference voltage source for the threshold voltage $V_{TH3}$; and its output terminal is connected to one input terminal of the AND circuit 73. Also, in the AND circuit 73, another input terminal is connected to the LD terminal, and its output terminal is connected to a setting terminal S of the SR flip-flop 74. Also, a resetting terminal R of the SR flip-flop 74 is connected to an output terminal of the one-shot circuit 71, and its output terminal Q is connected to a switching signal input terminal (not shown) of the switch 754. In the switch 754, its one input terminal is connected the reference voltage source for the overcurrent detection threshold value $V_{TH1}$; another input terminal is connected the reference voltage source for the overcurrent detection threshold value $V_{TH2}$; and its output terminal is connected to a reversal input terminal of the overcurrent detection comparator 5.

Also, an output terminal of the overcurrent detection comparator 5 is connected to an input terminal of the gate driving circuit 6. One output terminal of the gate driving circuit 6 is connected through the HD terminal to the gate terminal of the high-side MOSFET 2, and the other output terminal of the gate driving circuit 6 is connected through the LD terminal to the gate terminal of the low-side MOSFET 3.

In the control circuit 1 thus configured, the current detection circuit 4 outputs a current detection signal $V_{SNS}$, the overcurrent detection threshold value selecting comparator 72 outputs a signal $V_{CMP}$ used to automatically recognize the types of the current detection methods, the AND circuit 73 outputs a setting signal Vs to a setting terminal S of the SR flip-flop 74, the one-shot circuit 71 outputs a resetting signal $V_R$ to a resetting terminal R of the SR flip-flop 74, and the SR flip-flop 74 outputs a threshold selecting signal $V_Q$ for the switch 754 from its output terminal Q, and the overcurrent detection threshold value producing circuit 75 outputs an overcurrent detection threshold value $V_{TH}$.

The third DC/DC converter circuit, by alternately switching between the high-side MOSFET 2 connected to the input voltage source $V_{IN}$ and GND and the low-side MOSFET 3, supplies power through the inductor 8 to the load 10.

Figure 2:
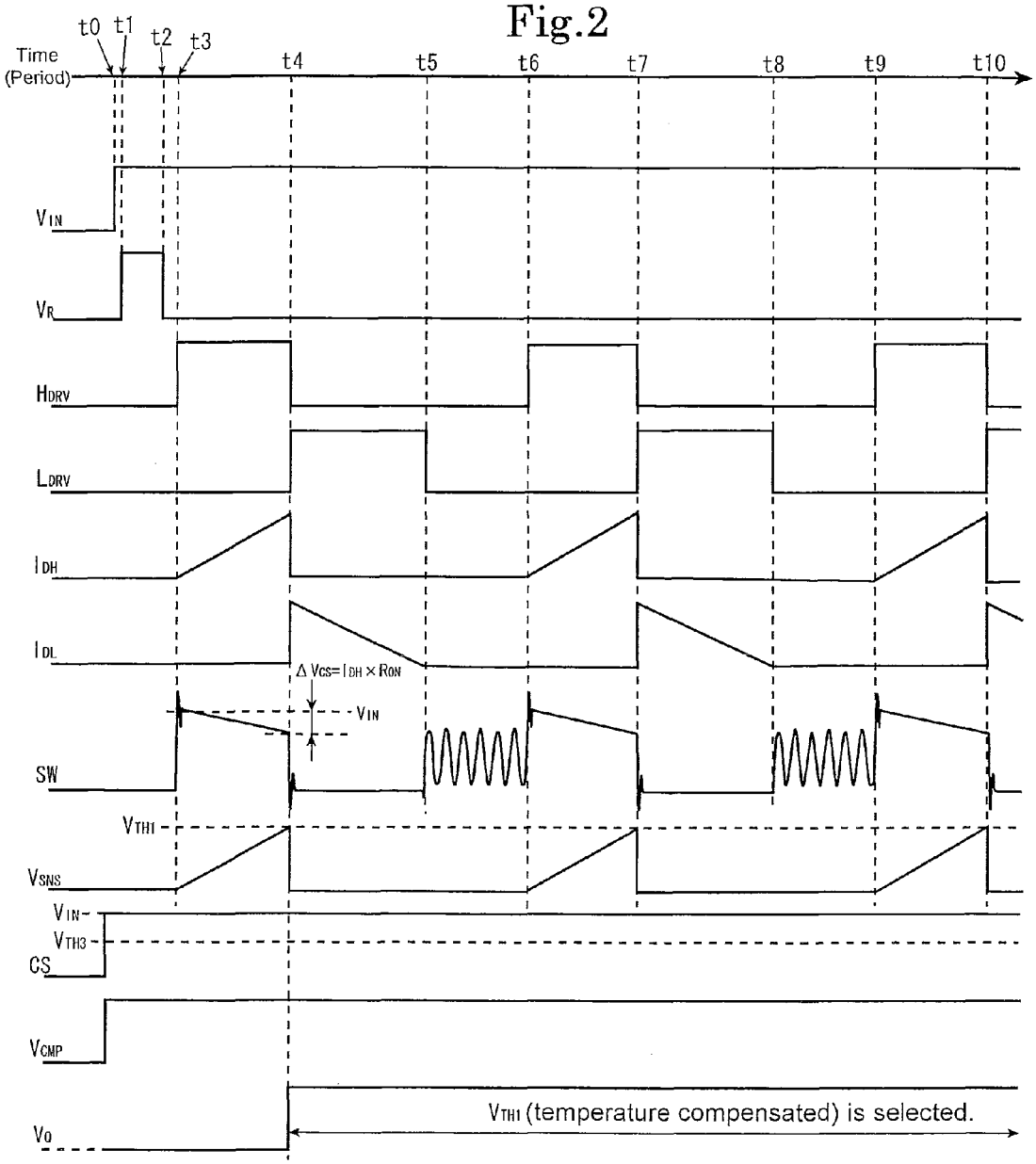
FIG. 2 is a time sequence diagram showing an operation signal of each of components of the control circuit shown in FIG. 1.

FIG. 2 is a time chart showing operations of the third DC/DC converter circuit and showing a waveform of the input voltage source signal $V_{IN}$, resetting signal $V_R$ for the SR flip-flop 74, gate signal $H_{DRV}$ for the high-side MOSFET 2, gate signal $L_{DRV}$ for the low-side MOSFET 3, current signal $I_{DH}$ flowing through the high-side MOSFET 2, current single $I_{DL}$ flowing through the low-side MOSFET 3, SW terminal signal, current detection signal $V_{SNS}$, CS terminal signal, output signal $V_{CMP}$ for the overcurrent detection threshold value selecting comparator 72, and threshold value selecting signal $V_Q$ of the SR flip-flop 74, respectively. Then, operations of the third DC/DC converter circuit are described by referring to FIG. 2.

When the input voltage source $V_{IN}$ is turned ON at time t0, the one-shot circuit 71 in the overcurrent detection threshold value selecting circuit 7 outputs the resetting signal $V_R$ to the resetting terminal R of the SR flip-flop 74 only for the period time of t1 to t2. This causes the threshold selecting signal $V_Q$ of the SR flip-flop to become a low-level signal.

In the overcurrent detection threshold selecting comparator 72, its reversal input terminal is connected to the voltage source for the threshold voltage $V_{TH3}$ being lower than that of the input voltage source $V_{IN}$; its non-reversal input terminal is connected through the CS terminal to the input voltage source $V_{IN}$; and its output terminal is connected to one input terminal of the AND circuit 73. As a result, the output signal $V_{CMP}$ of the overcurrent detection threshold value selecting comparator 72 exhibits a high level signal. The high-level output signal $V_{CMP}$ of the overcurrent detection threshold value selecting comparator 72 is inputted to one terminal of the AND circuit 73.

Another terminal of the AND circuit 73 is connected to the LD terminal (a terminal from which the gate signal LDRV of the low-side MOSFET 3 is outputted) and, at the timing (time t4) when the low-side MOSFET is turned ON, outputs a setting signal Vs to a setting terminal s of the SR flip-flop 74. Therefore, the SR flip-flop 74 outputs a high-level threshold value selecting signal $V_Q$ to the overcurrent detection threshold value producing circuit 75.

The switch 754 of the overcurrent detection threshold value 75, when receiving a high-level threshold value selecting signal $V_Q$, selects a temperature-compensated overcurrent detection threshold value $V_{TH1}$ and outputs it to the reversal input terminal of the overcurrent detection comparator 5.

The gate driving circuit 6 drives the high-side MOSFET 2 so as to be ON during periods of time of t3 to t4, t6 to t7, and t9 to t10 and to be OFF during periods of time of t1 to t3, t4 to t6, and t7 to t9 as the gate signal $H_{DRV}$ as indicating in FIG. 2. The gate driving circuit 6 alternately drives the low-side MOSFET 3 so as to be ON during periods of time of t4 to t5 and t7 to t8 and to be OFF during periods of time of t1 to t4, t5 to t7, and t8 to t10 as indicating in the gate signal $L_{DRV}$. However, it is needless to say that, at this point of time, dead time is set so that both the high-side MOSFET 2 and low-side MOSFET 3 are not simultaneously turned ON. The current $I_{DH}$ flows while the high-side MOSFET 2 is in its ON state and the current $I_{DL}$ flows while the low-side MOSFET 3 is in its ON state.

In the operational amplifier mounted in the current detection circuit 4, the reversal input terminal is connected through the SW terminal to the source terminal of the high-side MOSFET 2, and the non-reversal input terminal is connected through the CS terminal to the drain terminal of the high-side MOSFET 2; therefore, while the high-side MOSFET 2 is ON, based on a voltage $\Delta V_{CS}$ occurring in the ON resistor $R_{ON}$ of the high-side MOSFET 2, the current detection signal $V_{SNS}$ proportional to the current $I_{DH}$ flowing through the high-side MOSFET 2 is generated. That is, by the flowing of the current $I_{DH}$ during the ON period of the high-side MOSFET 2, the SW terminal signal (=voltage at the source terminal of the high-side MOSFET 2) to be inputted in the reversal input terminal of the operational amplifier mounted in the current detection circuit 4 changes as $\Delta V_{CS}=I_{DH} \times R_{ON}$ as shown in FIG. 2, relative to the CS terminal signal (=input voltage source $V_{IN}$) to be inputted to the non-reversal input terminal of the operational amplifier mounted in the current detection circuit 4; therefore, by calculating a difference between the SW terminal signal and CS terminal signal by the operational amplifier mounted in the current detection circuit 4, the voltage proportional to the current $I_{DH}$ is obtained as the current detection signal $V_{SNS}$ from the operational amplifier mounted in the current detection circuit 4.

The overcurrent detection comparator 5 compares the current detection signal $V_{SNS}$ with the temperature-compensated overcurrent detection threshold value $V_{TH1}$ and, when the current detection signal $V_{SNS}$ becomes higher than the overcurrent detection threshold value $V_{TH1}$, outputs an OFF-trigger signal to the gate driving circuit 6. The gate driving circuit 6 receives the OFF-trigger signal and output a low-level gate signal $H_{DRV}$ to the high-side MOSFET 2; thus, it causes the high-side MOSFET 2 to be turned OFF.

On the other hand, although the third DC/DC converter circuit of this embodiment uses the ON resistor $R_{ON}$ of the high-side MOSFET 2 to detect the current $I_{DH}$ flowing through the high-side MOSFET 2, the ON resistor $R_{ON}$ has a very large temperature dependence about +3000 ppm/° C. to +6000 ppm/° C. Therefore, it is necessary to make the overcurrent detection threshold value $V_{TH1}$ have a temperature coefficient in accordance with the temperature dependence of the ON resistor $R_{ON}$. Hereinafter, operations of the overcurrent detection threshold value producing circuit 75 are described in detail.

FIG. 5 shows one example of circuit configurations of an overcurrent detection threshold value producing circuit 75. The overcurrent detection threshold value producing circuit 75 comprises an NPN bipolar transistor 751, p-channel MOSFETs 752, 753, 754, and resistors R1 to R5. A line 755 shows a constant voltage line in which a predetermined constant voltage $V_{REG}$ has been set.

One terminal of the resistor R5 is connected to the constant voltage line 755, the other terminal of the resistor R5 is connected to one terminal of the resistor R3, the other terminal of the resistor R3 is connected to one terminal of the resistor R4, and the other terminal of the resistor R3 is connected to GND. A connection point connecting the other terminal of the resistor R3 and one terminal of the resistor R4 is connected to one input contact of the switch 754 to perform switching and selecting between the overcurrent detection threshold values $V_{TH1}$ and $V_{TH2}$. Thus, the constant voltage $V_{REG}$ from the constant voltage line 755, after being divided by the resistors (R3+R5) and resistor R4, is inputted as the overcurrent detection threshold value $V_{TH2}$ to one input contact of the switch 754.

Also, a source terminal of the p-channel MOSFET 752 is connected to the constant voltage line 755, a drain terminal of the p-channel MOSFET 752 is connected to a collector terminal of the NPN bipolar transistor 751, an emitter terminal of the NPN bipolar transistor 751 is connected one terminal of the resistor R1, and the other terminal of the resistor R1 is connected to GND. A short circuit is made between the drain of the p-channel 752 and its gate terminal. A base terminal of the NPN bipolar transistor 751 is connected to a connection point (voltage $V_B$) that connects the other terminal of the resistor R5 and one terminal of the resistor R3.

Also, a source terminal of the p-channel MOSFET 753 is connected to the constant voltage line 755, the drain terminal of the p-channel MOSFET 753 is connected to one terminal of the resistor R2, and the other terminal of the resistor R2 is connected to GND. A gate terminal of the p-channel MOSFET 753 is connected to a gate terminal of the p-channel MOSFET 752. A connection point that connects the drain terminal of the p-channel MOSFET 753 and one terminal of the resistor R2 is connected to the other input contact of the switch 754 to perform switching and selecting between the overcurrent detection threshold values $V_{TH1}$ and $V_{TH2}$. Thus, the constant voltage $V_{REG}$ from the constant voltage line 755 is divided by the resistors (R3 and R4) and the resistor R5 and, based on the divided voltage $V_B$, a voltage containing a temperature coefficient is generated by using a current mirror circuit comprised the p-channel MOSFETs 752 and 753 and is inputted as the overcurrent detection threshold $V_{TH1}$ to the other input contact of the switch 754.

As described above, the switch 754 allows the overcurrent detection threshold value $V_{TH2}$ to be inputted to its one input contact and the overcurrent detection threshold value $V_{TH1}$ to be inputted to its another input contact, thereby performs switching the overcurrent detection threshold value by the threshold value selecting signal $V_Q$, and outputs the overcurrent detection threshold value $V_{TH}$ from its output terminal. That is, the switch 754, when the threshold value selecting signal $V_Q$ is at a low level, selects the non temperature compensated overcurrent detection threshold value $V_{TH2}$ and outputs it as the overcurrent detection threshold value $V_{TH}$. When the threshold value signal $V_Q$ is at a high level, the switch 754 selects the temperature compensated overcurrent detection threshold value $V_{TH1}$ and outputs it as the overcurrent detection threshold value $V_{TH}$. When the overcurrent detection circuit is employed in the third DC/DC converter circuit shown in FIG. 1, the level of the threshold value selecting signal $V_Q$ becomes high and the overcurrent detection threshold value $V_{TH1}$ is selected. Also, if the overcurrent detection circuit is employed in the fourth DC/DC converter circuit in FIG. 3, as described later, the level of the threshold value selecting signal $V_Q$ becomes low, and the overcurrent detection threshold value $V_{TH2}$ is selected.

Here, a temperature characteristic of the overcurrent detection threshold value $V_{TH1}$ is described.

When the voltage $V_B$ obtained by dividing the constant voltage $V_{REG}$ by the resistors (R3+R4) and the resistor 5 is inputted to a base of the NPN bipolar transistor 751, a voltage dropped by about 0.6 V from the voltage $V_B$ is outputted from an emitter of the NPN bipolar transistor 751. The temperature characteristic of the emitter voltage contains the temperature characteristic of a voltage difference between the base and emitter of the NPN bipolar transistor 751 and thus is about +3000 ppm/° C. The current is converted by the resistor R1 based on the emitter voltage, and the overcurrent detection threshold value $V_{TH1}$ containing a temperature coefficient is produced by the resistor R2 through the current mirror circuit (the current I1 denotes a bias current of the current mirror circuit, and the current I2 denotes an output current of the current mirror circuit) comprised by the p-channel MOSFETs 752 and 753. By adjusting a ratio between the resistors R1 and R2, it is possible to make the overcurrent detection threshold value $V_{TH1}$ exhibit an arbitrary temperature coefficient.

Here, a relationship of temperature coefficients in this situation is expressed by the following equation (1).

$$\Delta V_{TH1}/\Delta T = +3000 \text{ ppm} \times R2/R1 \qquad \text{(Equation 1)}$$

where $\Delta V_{TH1}$ denotes an amount of change in the overcurrent detection threshold value $V_{TH1}$ and $\Delta T$ denotes an amount of change in the temperature T.

Figure 6:
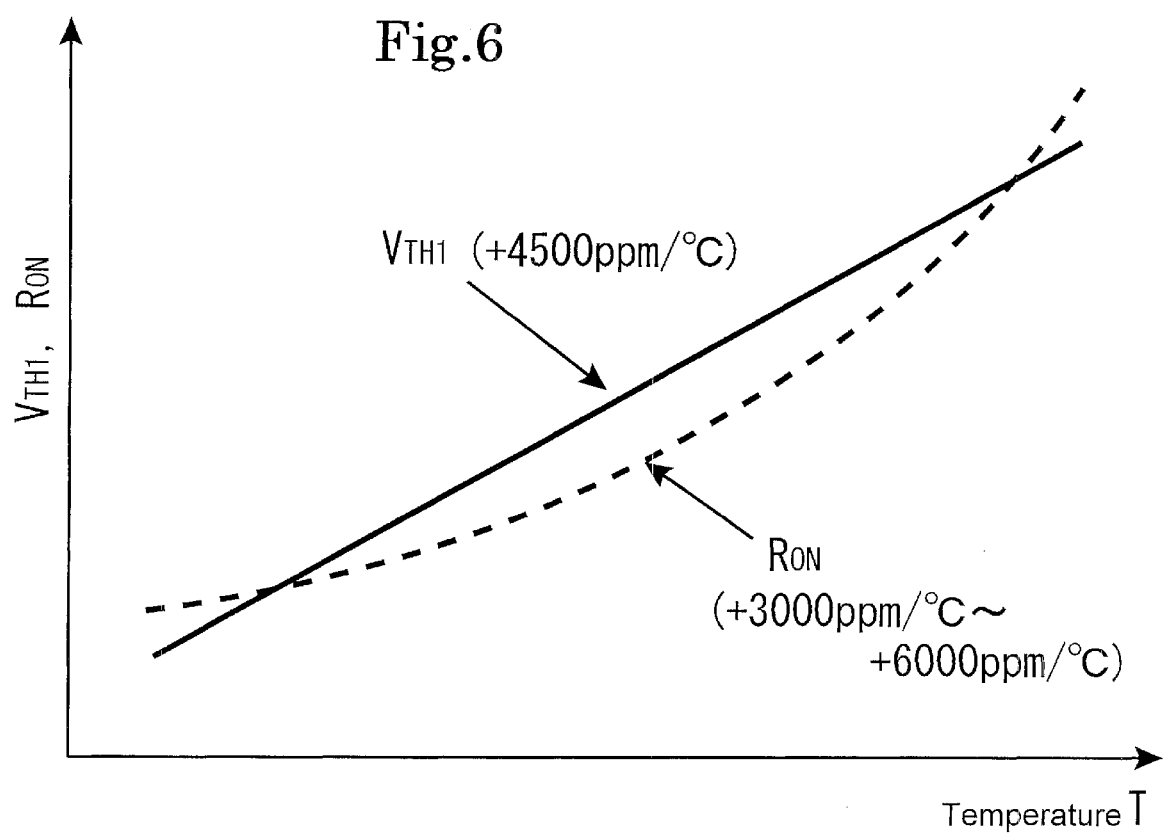
FIG. 6 is a diagram showing a concrete example of a temperature characteristic of an overcurrent detection threshold value for the overcurrent detection threshold value producing circuit and of a temperature characteristic of the ON resistor of the MOSFET according to the first embodiment of the present invention.

For example, to obtain the temperature coefficient of $\Delta V_{TH1}/\Delta T = +4500$ ppm/° C. for the overcurrent detection threshold value $V_{TH1}$, the ratio between the resistors R2 and R2 may be set for 1:1.36. FIG. 6 shows the state of the temperature dependence. The ON resistor $R_{ON}$ of the high-side MOSFET 2 is shown by broken lines, and the temperature coefficient of the overcurrent detection threshold value $V_{TH1}$ is shown by solid lines. The temperature dependence of the ON resistor $R_{ON}$ is multifarious because it depends on manufacturing processes, On resistance, withstand voltage, and the like. However, by adjusting the overcurrent detection threshold value $T_{TH1}$ so as to be an average of about +4500 ppm/° C., in spite of the overcurrent detecting method by using the ON resistor $R_{ON}$ of the high-side MOSFET 2, the ideal overcurrent detection without the dependence on temperatures can be realized.

Figure 4:
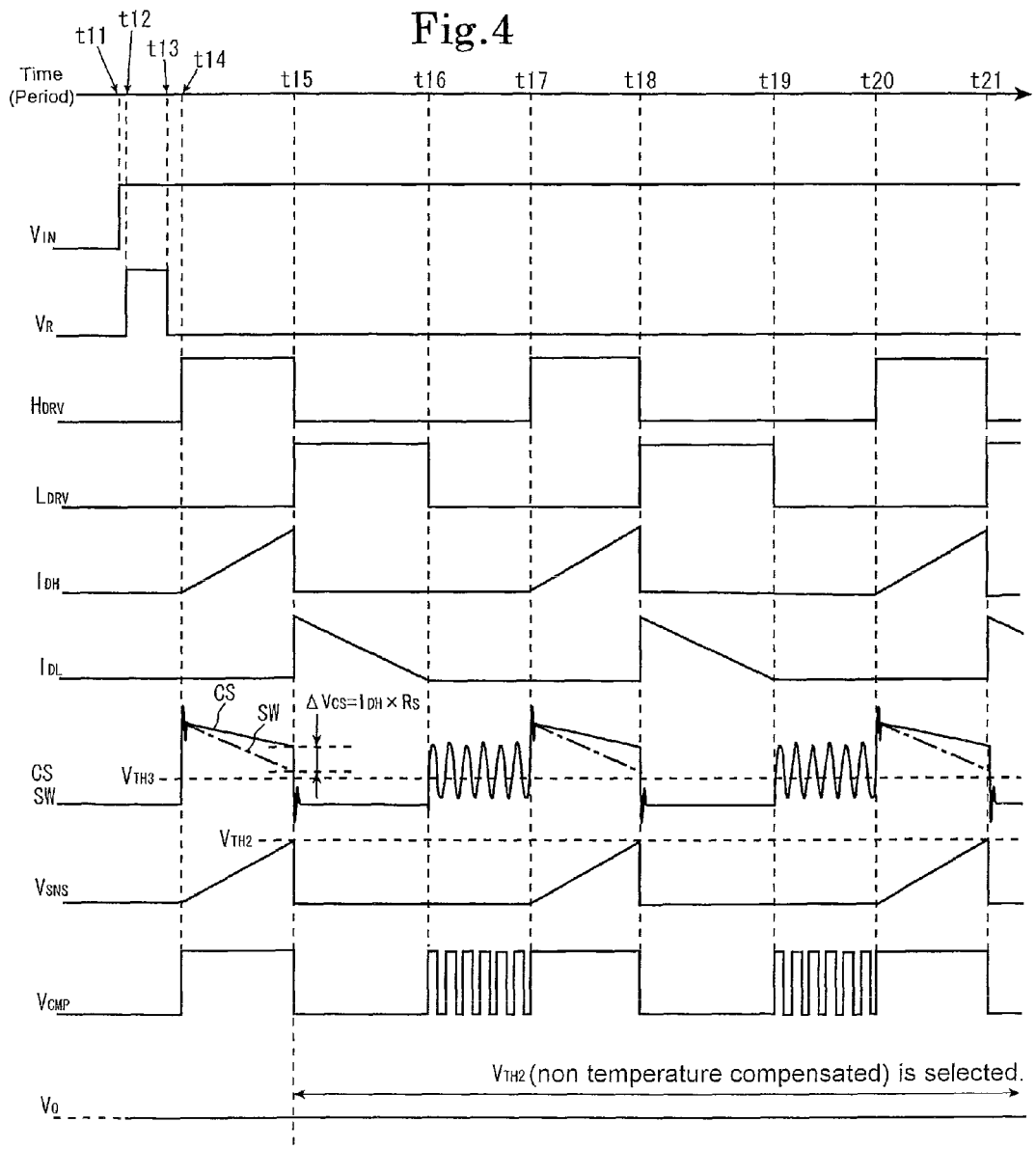
FIG. 4 is a time sequence diagram showing an operation signal of each of components of the control circuit shown in FIG. 3.

Then, circuit operations of the fourth DC/DC converter circuit are described by referring to FIGS. 3, 4, and 5.

FIG. 3 shows circuit configurations of the fourth DC/DC converter circuit, which differs a current detection method from that used in the third DC/DC converter circuit as shown in FIG. 1. Namely, the configurations of the fourth DC/DC converter circuit differ from those of the third DC/DC converter circuit in that: the external current detection resistor Rs is connected between the source terminal of the high-side MOSFET 2 and the drain terminal of the low-side MOSFET 3, the SW terminal is connected to a low potential side of the external current detection resistor Rs, and the CS terminal is connected to a high potential side of the external current detection resistor Rs. The configurations other than above are the same as those of the third DC/DC converter circuit. The external current detection resistor Rs, current detection circuit 4, overcurrent detection comparator 5, and overcurrent detection threshold value selecting circuit 7 comprise the overcurrent detection circuit.

FIG. 4 is a time chart showing operations of the third DC/DC converter circuit and showing a waveform of the input voltage source signal $V_{IN}$, resetting signal $V_R$ for the SR flip-flop 74, gate signal $H_{DRV}$ for the high-side MOSFET 2, gate signal $L_{DRV}$ for the low-side MOSFET 3, current signal $I_{DH}$ flowing through the high-side MOSFET 2, current single $I_{DL}$ flowing through the low-side MOSFET 3, CS terminal signal, SW terminal signal, current detection signal $V_{SNS}$, output signal $V_{CMP}$ for the overcurrent detection threshold value selecting comparator 72, and threshold value selecting signal $V_Q$ of the SR flip-flop 74, respectively. The SW terminal signal superimposed on the CS terminal signal is shown by dashed lines. As follows, the fourth DC/DC converter circuit is described by referring to FIGS. 3 and 4.

When the input voltage source $V_{IN}$ is turned ON at time t11, the one-shot circuit 71 in the overcurrent detection threshold value selecting circuit 7 outputs the resetting signal $V_R$ to the resetting terminal R of the SR flip-flop 74 only for the period time of t12 to t13. This causes the threshold selecting signal $V_Q$ of the SR flip-flop 74 to become at a low level.

In the overcurrent detection threshold selecting comparator 72, its reversal input terminal is connected to the threshold voltage $V_{TH3}$ being lower in voltage than the input voltage source $V_{IN}$, its non reversal input terminal is connected through the CS terminal to the source terminal of the high-side MOSFET 2, and its output terminal is connected to one input terminal of the AND circuit 73. Thus, a voltage at one input terminal of the AND circuit 73, which is the output signal $V_{CMP}$ from the overcurrent detection threshold selecting comparator 72, changes in accordance with switching of the high-side MOSFET 2; it becomes high when the high-side MOSFET 2 is ON; and it becomes low when the high-side MOSFET 2 is OFF and low-side MOSFET 3 is ON.

Another input terminal of the AND circuit 73 is connected to the LD terminal (a terminal to which the gate signal $L_{DRV}$ of the low-side MOSFET 3 is connected); at timing (time t15) when the low-side MOSFET 3 is turned ON, the output signal $V_{CMP}$ of the overcurrent detection threshold selecting comparator 72 is at a low level, and, therefore, the AND circuit 73 does not output the setting signal Vs to the setting terminal S of the SR flip-flop 74. Therefore, the SR flip-flop 74 outputs the low-level threshold selecting signal $V_Q$ to the overcurrent detection threshold value producing circuit 75.

The switch 754 of the overcurrent detection threshold value producing circuit 75, after receiving the low-level threshold value selecting signal $V_Q$, selects the non temperature-compensated overcurrent detection threshold value $V_{TH2}$ and outputs it as the overcurrent detection threshold value $V_{TH}$ to the reversal input terminal of the overcurrent detection comparator 5.

The gate driving circuit 6 drives the high-side MOSFET 2, as shown by the gate signal $H_{DRV}$ in FIG. 4, so as to be turned ON during periods of t14 to t15, t17 to t18, and t20 to t21 and so as to be turned OFF during periods of t12 to t14, t15 to t17, and t18 to t20. Also, the gate driving circuit 6 also drives alternately the low-side MOSFET 3, as shown by the gate signal $L_{DRV}$, so as to be turned ON during periods of t15 to t16 and t18 to t19, and so as to be turned OFF during periods of t12 to t15, t16 to t18, and t19 to t21. However, it is needless to say that dead time is provided so that the high-side MOSFET 2 and low-side MOSFET 3 are not simultaneously turned ON. During the period while the high-side MOSFET 2 is ON, the current $I_{DH}$ flows; and during the period while the low-side MOSFET 3 is ON, the current $I_{DL}$ flows.

The reversal input terminal of the operational amplifier in the current detection circuit 4 is connected through the SW terminal to the low potential side of the external current detection resistor Rs, and its non reversal input terminal is connected through the CS terminal to the high potential side of the external current detection resistor Rs; and, during the period while the high-side MOSFET is ON, based on the voltage $\Delta V_{CS}$ across the external current detection resistor Rs, the current detection signal $V_{SNS}$ proportional to the current $I_{DH}$ flowing through the high-side MOSFET 2 is generated. That is, due to the flowing of the current $I_{DH}$ for the period while the high-side MOSFET 2 is ON, the SW terminal signal (=a low potential side voltage of the external current detection resistor Rs) to be inputted to the reversal input terminal of the operational amplifier mounted in the current detection circuit 4 changes by $\Delta V_{CS} = I_{DH} \times Rs$, as shown in FIG. 4, relative to the CS terminal signal (=a high-potential side voltage of the external current detection resistor Rs). By calculating a difference between the SW terminal signal and the CS terminal signal by the operational amplifier mounted in the current detection circuit 4, a voltage proportional to the current $I_{DH}$ as the current detection signal $V_{SNS}$ is obtained from the operational amplifier mounted in the current detection circuit 4.

The overcurrent detection comparator 5 compares the current detection signal $V_{SNS}$ with the non temperature-compensated overcurrent detection threshold value $V_{TH2}$ and, when the current detection signal $V_{SNS}$ is higher than the overcurrent detection threshold value $V_{TH2}$, outputs an OFF-trigger signal to the gate driving circuit 6. The gate driving circuit 6, when receiving the OFF-trigger signal, outputs the low-level gate signal $H_{DRV}$ to the high-side MOSFET 2 to turn off the high-side MOSFET 2.

By the series of operations as above, in the circuit configuration in which a current is detected by the ON resistor $R_{ON}$ of the high-side MOSFET 2 as shown in the third DC/DC converter circuit, the temperature-compensated overcurrent detection threshold value $V_{TH1}$ is automatically selected; otherwise, in the circuit configuration in which a current is detected by the external current detection resistor Rs as shown in the fourth DC/DC converter circuit, the non temperature-compensated overcurrent detection threshold value $V_{TH2}$ is automatically selected; and, therefore, an optimized overcurrent detection without depending on applications is made possible.

Second Embodiment

Figure 7:
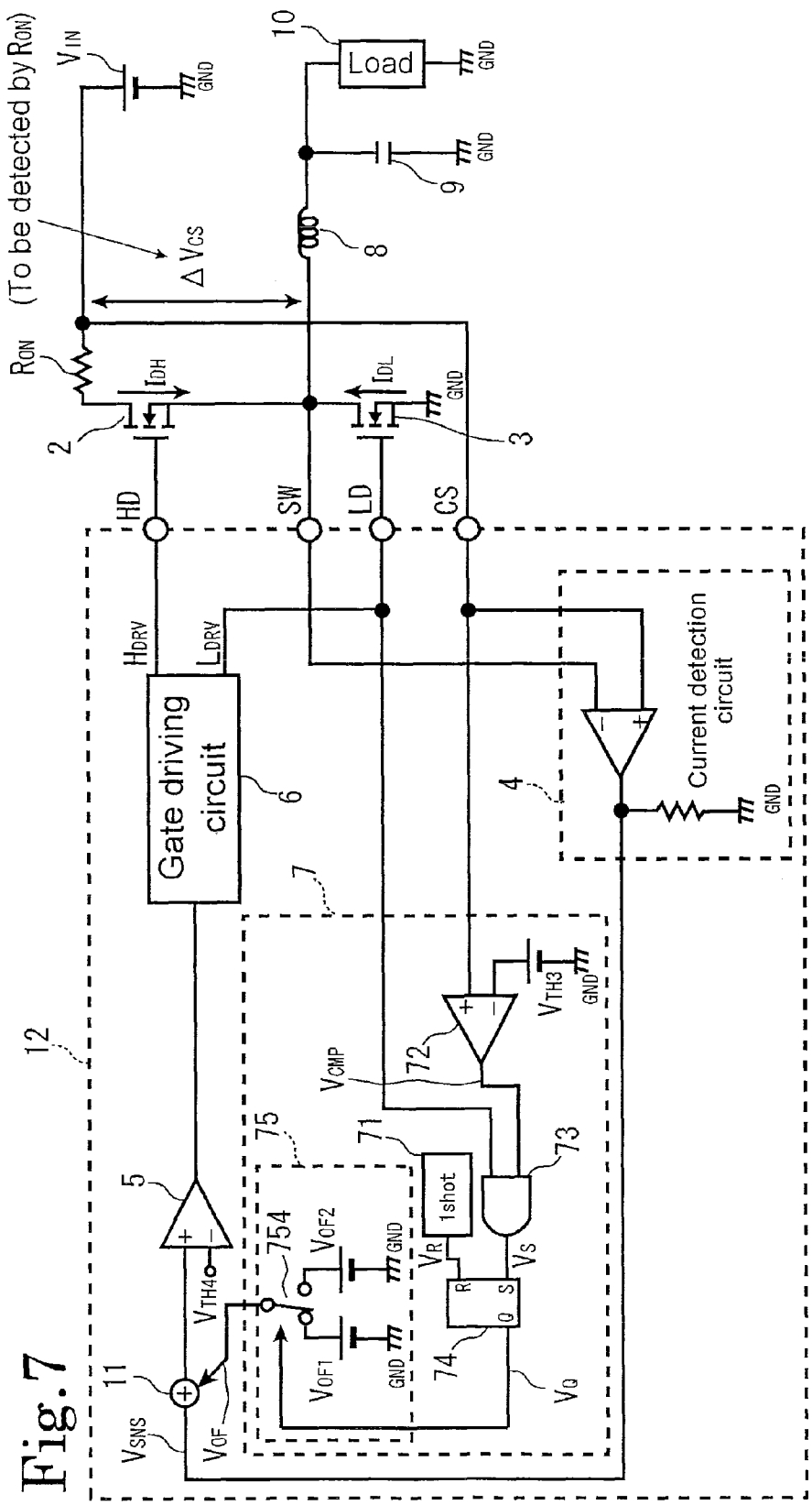
FIG. 7 is a diagram showing a concrete example of a switching power supply unit using an overcurrent detection circuit in which an overcurrent is detected by an ON resistor of a MOSFET according to a second embodiment of the present invention.

Further, FIG. 7 shows configurations of a switching power supply unit by using an overcurrent detection circuit according to the second embodiment of the present invention. The switching power supply unit shown in FIG. 7 corresponds to the third DC/DC converter circuit in FIG. 1 in the first embodiment in which an overcurrent is detected by the ON resistor $R_{ON}$ of the MOSFET and is hereinafter called a fifth DC/DC converter circuit. A sixth DC/DC converter circuit corresponding to the fourth DC/DC converter circuit as shown in FIG. 3 in the first embodiment in which an overcurrent is detected by the external current detection resistor Rs is naturally envisioned, however, its illustration is omitted.

The control circuit 12 employed in the fifth DC/DC converter circuit shown in FIG. 7 is so configured that an Offset voltage $V_{OF}$ is superimposed on the current detection signal $V_{SNS}$, and the offset voltage $V_{OF}$ is temperature-compensated. Configurations other than above are the same as those in the first embodiment. In that manner, the same effect as realized in the first embodiment can be obtained in the second embodiment.

More specifically, in the case where a current is detected by the ON resistor $R_{ON}$ of the high-side MOSFET 2, a temperature-compensated offset voltage $V_{OF1}$ is selected; and, in the case of the un-illustrated sixth DC/DC converter circuit where a current is detected by the external current detection resistor Rs, a non temperature-compensated offset voltage $V_{OF2}$ is selected, and, after the offset voltage $V_{OF2}$ is added by an adder 11 to the output signal $V_{SNS}$ of the current detection circuit 4 and is inputted to the non-reversal input terminal of the overcurrent detection comparator 5. On the other hand, to a reversal input terminal of the overcurrent detection comparator 5 is inputted a constant overcurrent detection threshold value $Y_{TH4}$. By configuring above, in the case of the fifth DC/DC converter circuit, the temperature-compensated voltage $V_{SNS}+V_{OF1}$ are compared with the overcurrent detection threshold value $V_{TH4}$ by the overcurrent detection comparator 5; in the case of the sixth DC/DC converter, the non temperature-compensated voltage $V_{SNS}+V_{OF2}$ are compared with the overcurrent detection threshold value $V_{TH4}$ by the overcurrent detection comparator 5; and, therefore, in any case, the overcurrent detection comparator 5 can perform detection of an overcurrent without being influenced by temperatures. In these cases, the temperature compensation on the overcurrent detection threshold $V_{TH4}$ is not required. The temperature-compensated offset voltage $V_{OF1}$ and non temperature-compensated offset voltage $V_{OF2}$ can be produced by matching a voltage level to the offset voltage by using the circuit being the same as the overcurrent detection threshold value producing circuit 75 as shown in FIG. 5.

Third Embodiment

Figure 8:
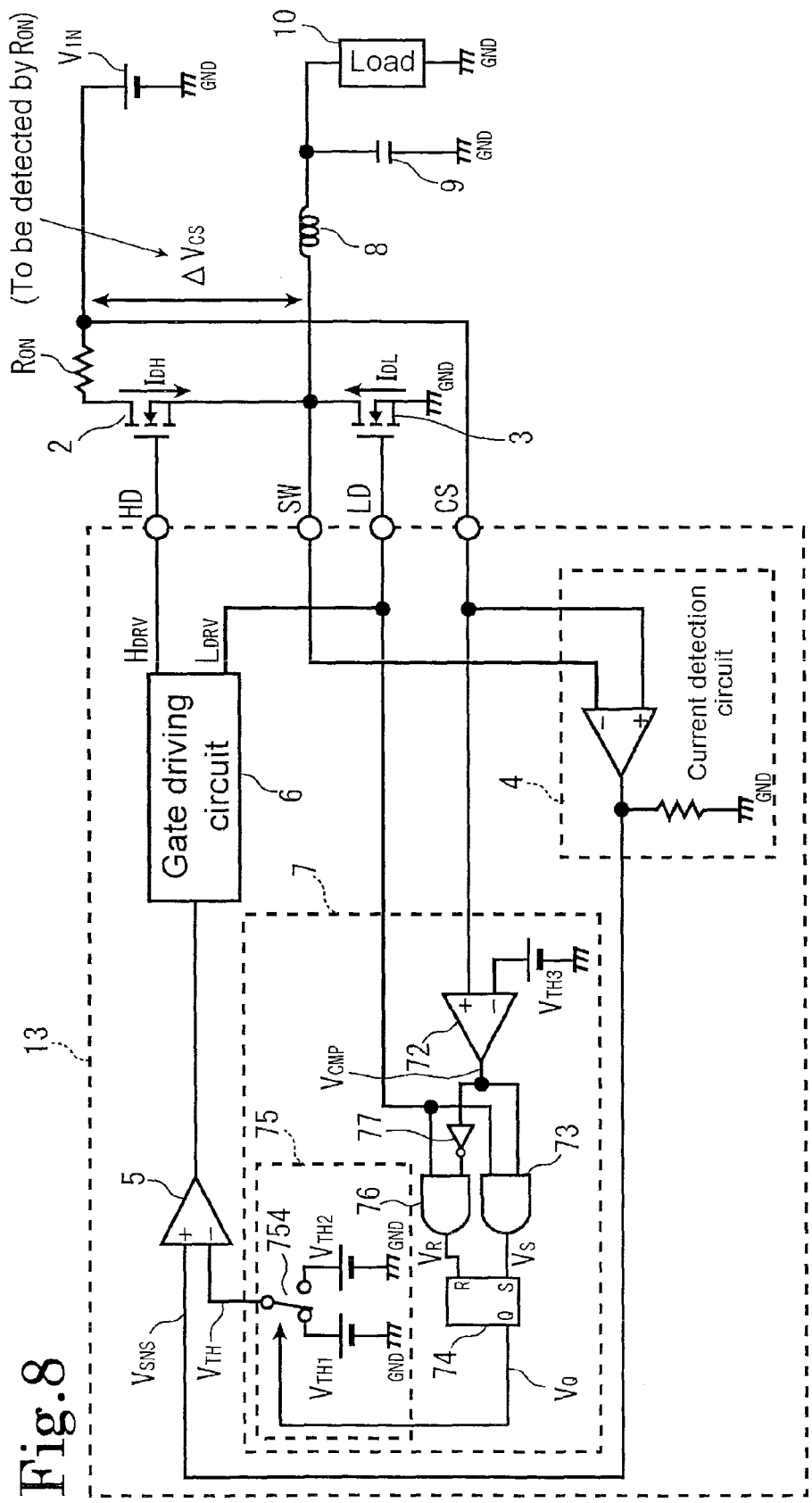
FIG. 8 is a diagram showing a concrete example of a switching power supply unit using an overcurrent detection circuit in which an overcurrent is detected by an ON resistor of a MOSFET according to a third embodiment of the present invention.

Furthermore, FIG. 8 shows configurations of a switching power supply unit employing an overcurrent detection circuit according to the third embodiment of the present invention. The switching power supply unit shown in FIG. 8 corresponds to the third DC/DC converter circuit in FIG. 1 in the first embodiment in which an overcurrent is detected by the ON resistor $R_{ON}$ of the MOSFET and is hereinafter called a seventh DC/DC converter circuit. An eighth DC/DC converter corresponding to the fourth DC/DC converter circuit as shown in FIG. 3 in the first embodiment in which an overcurrent is detected by the external current detection resistor Rs is naturally envisioned, however, its illustration is omitted.

In the control circuit 13 of the eighth DC/DC converter circuit, the one-shot circuit 71 shown in FIG. 3 in the first embodiment has been removed, and a new AND circuit 76 and an inverter circuit 77 are added. Configurations other than above are the same as the first embodiment. In this manner, the same effect as realized in the first embodiment can be obtained.

More specifically, during the period while the low-side MOSFET 3 is ON, if a non-reversal input terminal voltage of the overcurrent detection threshold value selecting comparator 72 is higher than the threshold voltage $V_{TH3}$ (being equivalent to that of the seventh DC/DC converter), the output signal $V_{CMP}$ from the overcurrent detection threshold value selecting comparator 72, which is also one input signal to the AND circuit 73, becomes high; the gate signal $L_{DRV}$, which is also another input signal to the AND circuit 73, becomes high; and, thus, the AND circuit 73 supplies the high-level setting signal Vs to the setting terminal S of the SR flip-flop 74. At this point of time, the output signal $V_{CMP}$ from the overcurrent detection threshold value selecting comparator 72 is inverted by the inverter circuit 77, supplying a low signal to one terminal of the AND circuit 76; the gate signal $L_{DRV}$ being another input to the AND circuit 76 becomes high; and, therefore, the AND circuit 76 outputs the low-level resetting signal $V_R$ to the resetting terminal R of the SR flip-flop 74. This causes the SR flip-flop 74 to output a high-level $V_Q$ signal so that the overcurrent detection threshold value producing circuit 75 selects the temperature-compensated overcurrent detection threshold value $V_{TH1}$, and the overcurrent detection threshold value producing circuit 75 selects and outputs the temperature-compensated overcurrent detection threshold value $V_{TH1}$ by using the switch 754 (this means that the method of detecting an overcurrent is automatically judged as the overcurrent detection method by using the ON resistor $R_{ON}$ of the high-side MOSFET 2).

On the contrary, during the period while the low-side MOSFET 3 is ON, if a non-reversal input terminal voltage of the overcurrent detection threshold value selecting comparator 72 is lower than the threshold voltage $V_{TH3}$ (being equivalent to that of the un-illustrated eighth DC/DC converter), the output signal $V_{CMP}$ from the overcurrent detection threshold value selecting comparator 72, which is also one input signal to the AND circuit 73, becomes low; the gate signal $L_{DRV}$, which is also another input signal to the AND circuit 73, becomes high; and, thus, the AND circuit 73 supplies the low-level setting signal S to the setting terminal S of the SR flip-flop 74. On the other hand, the output signal $V_{CMP}$ from the overcurrent detection threshold value selecting comparator 72 is inverted by the inverter circuit 77, supplying a high-level signal to one terminal of the AND circuit 76; the gate signal $L_{DRV}$ being another input of the AND circuit 76 also becomes high; and, therefore, the AND circuit 76 supplies the high-level resetting signal R to the resetting terminal R of the SR flip-flop 74. This causes the SR flip-flop 74 to output the low-level signal $V_Q$ so that the overcurrent detection threshold value producing circuit 75 selects the non temperature-compensated overcurrent detection threshold value $V_{TH2}$, and the overcurrent detection threshold value producing circuit 75 selects and outputs the non temperature-compensated overcurrent detection threshold value $V_{TH2}$ (this means that the method of detecting an overcurrent is automatically judged as the overcurrent detection method by using the external current detection resistor Rs).

Thus, according to the embodiment, as in the case of the first embodiment, an optimized overcurrent detection without depending on applications is made possible.

Other Embodiment

In the above first to third embodiment, protection from an overcurrent is performed by detecting an overcurrent flowing through the high-side MOSFET 2, however, protection from an overcurrent can be performed by detecting an overcurrent flowing through the low-side MOSFET 3.

More specifically, when an ON resistor $R_{ON}'$ of the low-side MOSFET 3 is used for the detection of currents, the CS terminal is connected to the drain terminal of the low-side MOSFET 3. Also, when an external current detection resistor Rs' is used for the detection of currents, the external current detection resistor Rs' is connected between the source terminal of the low-side MOSFET 3 and GND in series, and the CS terminal is connected to the source terminal of the low-side MOSFET 3. Here, the overcurrent detection threshold value selecting circuit 7, when a voltage of the CS terminal is lower than the threshold voltage $V_{TH3}$ during the period while the low-side MOSFET 3 is ON, the overcurrent detection threshold value $V_{TH2}$ is selected as an overcurrent detection threshold value; and, when a voltage of the CS terminal is higher than the threshold voltage $V_{TH3}$ during the period while the low-side MOSFET 3 is OFF and the high-side MOSFET 2 is ON, the overcurrent detection threshold $V_{TH1}$ is selected as the overcurrent detection threshold value. Then, when the overcurrent detection comparator 5 detects an overcurrent, the gate driving circuit 6 may output the gate signal $L_{DRV}$ which turns off the low-side MOSFET 3.

By configuring above, as in the cases of first to third embodiments, the current detection method for detecting an overcurrent flowing through the low-side MOSFET 3 can be automatically selected, which enables an optimized detection of currents without depending on applications.

As above, this invention is described by the embodiments. However, it is apparent that the present invention is not limited to the above embodiments but may be changed and modified without departing from the scope and spirit of the invention. For example, instead of the high-side MOSFET 2 and low-side MOSFET 3, a bipolar transistor or an IGBT (Insulated Gate Bipolar Transistor) may be employed in which same operations as in the MOSFETs 2 and 3 can be performed by matching the overcurrent detection threshold value $V_{TH1}$ to temperature characteristics of the bipolar transistor or IGBT. Also, the same operations can be performed by connecting the CS terminal to the reversal input terminal of the overcurrent detection threshold value selecting comparator 72; by connecting a voltage source of the threshold voltage $V_{TH3}$ to the non reversal input terminal; and by processing a code of the output signal $V_{CMP}$ of the overcurrent detection threshold value selecting comparator 72 by using reverse logic. Moreover, though not shown, a flywheel diode is connected in reverse parallel to the high-side MOSFET 2 and low-side MOSFET 3.

What is claimed is:

1. A switching power supply unit having a first switch and a second switch both connected in series to an input voltage source to supply power to a load from between said first switch and said second switch comprising:

a current detection device to detect a current flowing through said first switch and to output as a current detection signal;

a first current detection terminal to be connected to any one of one terminal and another terminal of said first switch;

an overcurrent detection circuit to detect an overcurrent flowing through said first switch by comparing said current detection signal with an overcurrent detection threshold value; and an overcurrent detection threshold value selecting device to change said overcurrent detection threshold value of said overcurrent detection circuit depending on whether said first current detection terminal is connected to said one terminal of said first switch or said first current detection terminal is connected to said another terminal of said first switch.

2. The switching power supply unit according to claim 1, wherein said overcurrent detection threshold value selecting device, when said first current detection terminal is connected to said one terminal of said first switch, uses a temperature-compensated first overcurrent detection threshold value as said overcurrent detection threshold value for said overcurrent detection circuit and, when said first current detection terminal is connected to said another terminal of said first switch, uses a non temperature-compensated second overcurrent detection threshold value as said overcurrent detection threshold value of said overcurrent detection circuit.

3. The switching power supply unit according to claim 1, wherein said first switch is a high-side switch and said second switch is a low-side switch.

4. The switching power supply unit according to claim 3, wherein said overcurrent detection threshold value selecting device, when a voltage of said first current detection terminal is higher than a predetermined threshold voltage during a period while said high-side switch is off, uses said first overcurrent detection threshold value as said overcurrent detection threshold value of said overcurrent detection circuit.

5. The switching power supply unit according to claim 3, wherein said overcurrent detection threshold value selecting device, when a voltage of said first current detection terminal is lower than said predetermined threshold voltage during a period while said high-side switch is off and said low-side switch is on, uses said second overcurrent detection threshold value as said overcurrent detection threshold value.

6. A switching power supply unit having a first switch and second switch both connected in series to an input voltage source to supply power to a load from between said first switch and said second switch, comprising:
   a current detection device to detect a current flowing through said first switch and to output as a current detection signal;
   a first current detection terminal to be connected to any one of one terminal and another terminal of said first switch;
   an offset voltage selecting device to select a different offset voltage depending on whether said first current detection terminal is connected to said one terminal of said first switch or said first current detection terminal is connected to said another terminal of said first switch; and
   an overcurrent detection circuit to detect an overcurrent flowing through said first switch by comparing a value obtained by adding said offset voltage to said current detection signal with an overcurrent detection threshold value.

7. The switching power supply unit according to claim 6, wherein said offset voltage selecting device, when said first current detection terminal is connected to one terminal of said first switch, uses a temperature-compensated first offset voltage as said offset voltage and, when said first current detection terminal is connected to said another terminal of said first switch, uses a non temperature-compensated second offset voltage as said offset voltage.

8. The switching power supply unit according to claim 6, wherein said first switch is a high-side switch and said second switch is a low-side switch.

9. The switching power supply unit according to claim 8, wherein said offset voltage, when a voltage of said first current detection terminal is higher than a predetermined threshold voltage during a period while said high-side switch is off, is generated by adding said first offset voltage to said current detection signal.

10. The switching power supply unit according to claim 8, wherein said offset voltage, when a voltage of said first current detection terminal is lower than said predetermined threshold voltage during a period while said high-side switch is off and said low-side switch is on, is generated by adding said second offset voltage to said current detection signal.

11. A control circuit for a switching power supply unit for detecting a current flowing through a first switch as a current detection signal and for detecting an overcurrent by comparing said current detection signal with an overcurrent detection threshold value and for protecting said switching power supply unit by turning off said first switch, comprising:
   a first current detection terminal to be connected to any one of one terminal and another terminal of said first switch; and
   a temperature compensation device to perform switching to provide temperature compensation to any one of said overcurrent detection threshold value and said current detection signal depending on an voltage inputted to said first current detection terminal.

* * * * *